March 14, 1950          T. R. CLARK          2,500,802
INDUCTION MOTOR AND METHOD OF MANUFACTURE
Filed Sept. 26, 1946          4 Sheets-Sheet 1
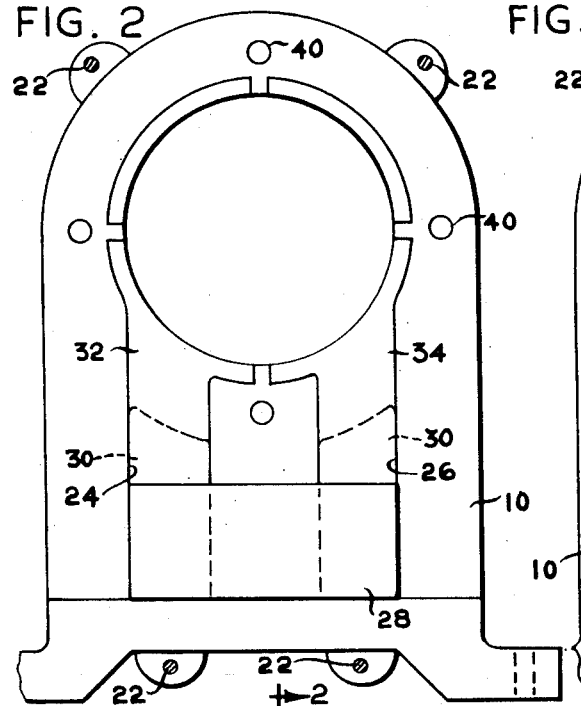
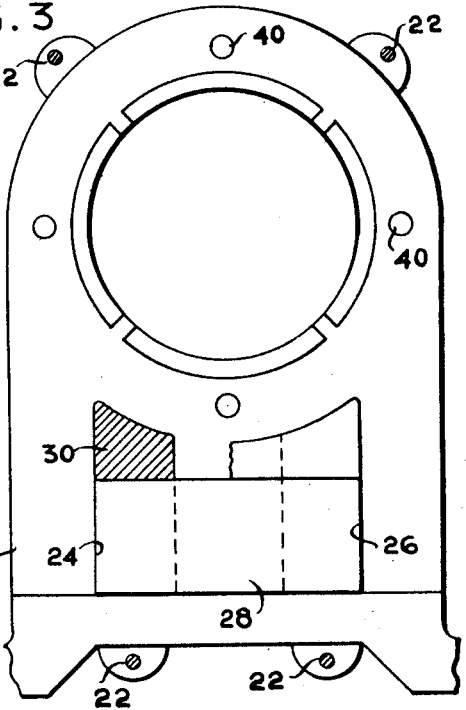
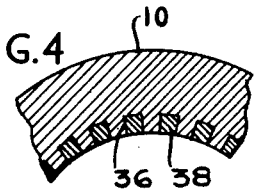
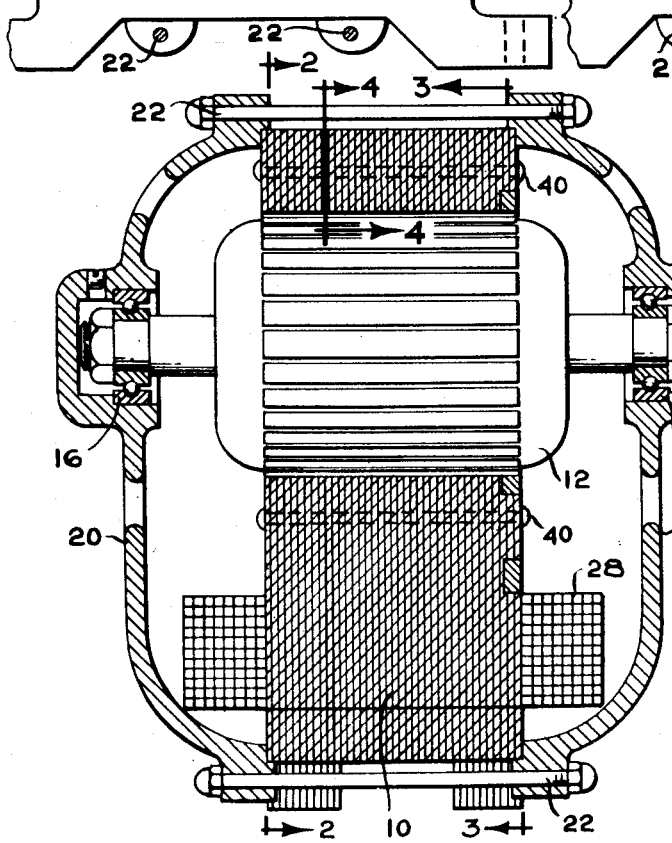
INVENTOR
THOMAS R. CLARK
BY
Toulmin & Toulmin
ATTORNEYS March 14, 1950     T. R. CLARK     2,500,802
INDUCTION MOTOR AND METHOD OF MANUFACTURE
Filed Sept. 26, 1946     4 Sheets-Sheet 2
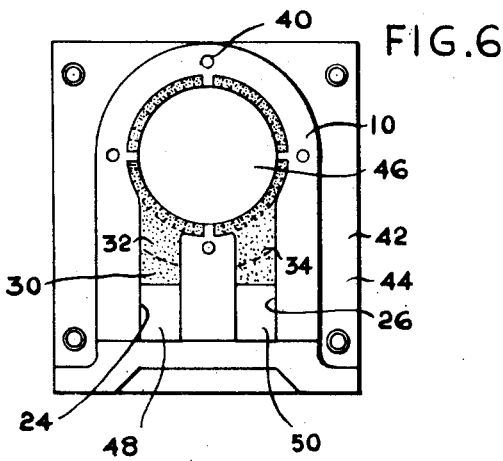
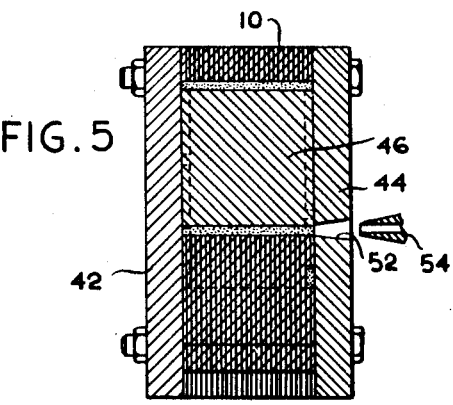
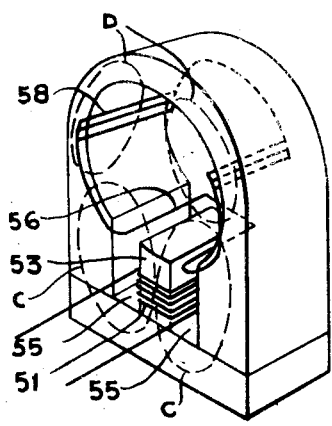
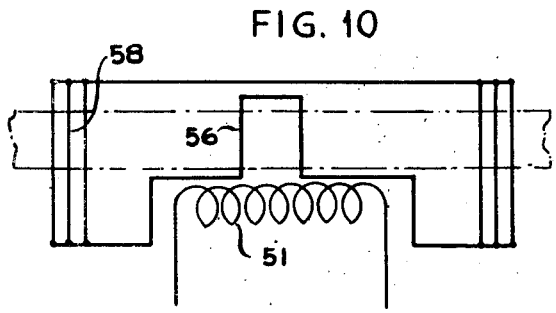
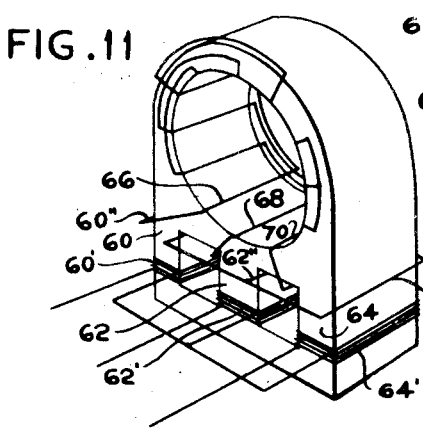
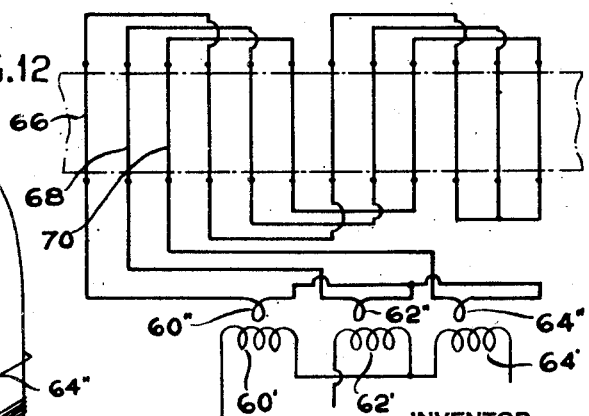
INVENTOR
THOMAS R. CLARK
BY
Toulmin & Toulmin
ATTORNEYS

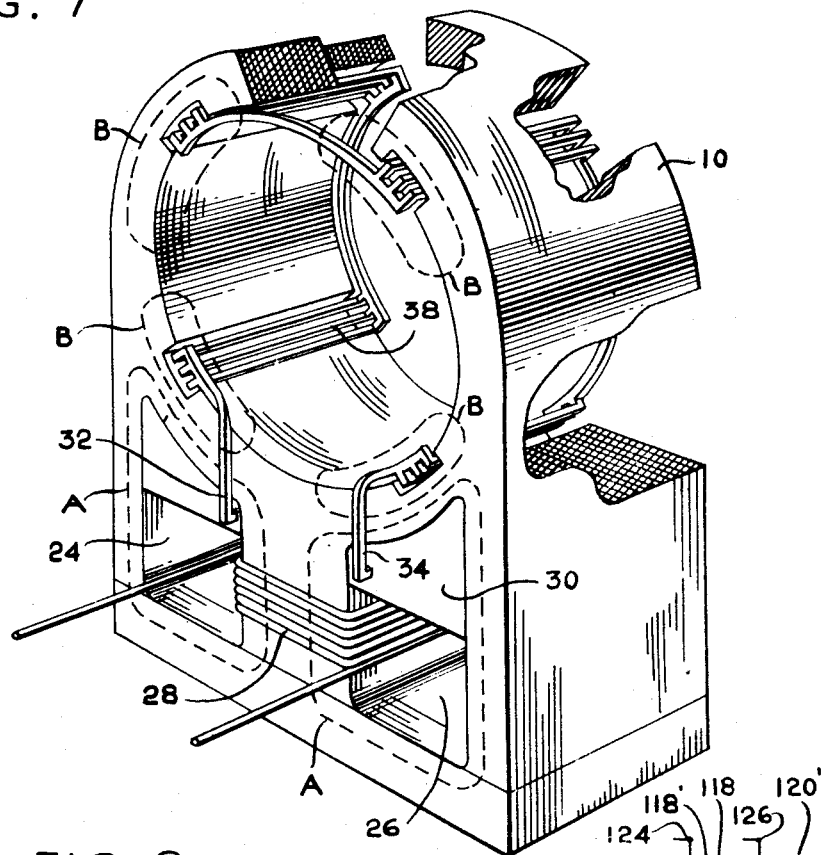
FIG. 7
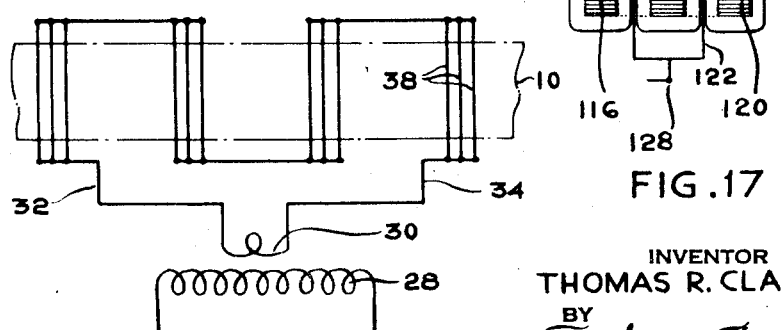
FIG. 8
FIG. 17
INVENTOR
THOMAS R. CLARK
BY
Toulmin & Toulmin
ATTORNEYS March 14, 1950  T. R. CLARK  2,500,802
INDUCTION MOTOR AND METHOD OF MANUFACTURE
Filed Sept. 26, 1946  4 Sheets-Sheet 4

INVENTOR
THOMAS R. CLARK
BY
Toulmin & Toulmin
ATTORNEYS

Patented Mar. 14, 1950

2,500,802

UNITED STATES PATENT OFFICE 2,500,802

INDUCTION MOTOR AND METHOD OF MANUFACTURE

Thomas R. Clark, Dayton, Ohio

Application September 26, 1946, Serial No. 699,393

8 Claims. (Cl. 172—120)

This invention relates to electric motors and to methods of manufacturing the same.

The primary object of the present invention is to provide a motor construction in which more efficient use is made of the material in the magnetic circuit and of the material in the conductors.

In electric motors, especially alternating current motors, considerable space is lost in the winding slots in the stator because of the insulation required around the individual conductors of the field windings. Inasmuch as the material expense in an electric motor is high, it is desirable that all the materials therein be used to their fullest efficiency. This requires that the minimum amount of space be devoted to insulation and air gaps. The useful conductor material per slot in the stator can be increased if the number of turns of wire in the said slot are decreased, the optimum condition being obtained when there is but a single conductor per slot. This condition is obtainable, however, only by passing an exceedingly high current through the conductor and under a relatively low applied voltage. Under these conditions, the required ampere turns to create the necessary field strength may be developed. The current required is in excess of that usually obtainable from commercial lines, and the applied voltage necessary is substantially less than commercial voltages. Accordingly, it is necessary that a step-down transformer be employed for developing a low voltage supply of sufficient amperage.

In order still more efficiently to use the magnetic material in the motor and transformer, this invention proposes the combination thereof into an integral unit. In this manner, a minimum amount of iron and conductive material for both the transformer and motor may be employed.

Accordingly, it is a still further object of the present invention to provide a transformer and an electric motor supplied thereby as an integral unit.

Another object is the provision of an electric motor and a transformer integral therewith in which at least the motor windings are integrally cast in the magnetic frame of the motor and transformer.

It is also an object of this invention to apply the foregoing principles to the construction of single-phase motors, multi-phase motors, self-starting motors, and to motors having a plurality of windings therein.

The nature of this invention will be better understood upon reference to the following description taken in connection with the attached drawings in which:

Figure 1 is a vertical section through a motor-transformer combination according to this invention;

Figures 2 and 3 are vertical sections indicated respectively by the lines 2—2 and 3—3 on Figure 1;

Figure 4 is a fragmentary section indicated by the line 4—4 on Figure 1;

Figures 5 and 6 are somewhat diagrammatic views illustrating the manner of casting the stator windings into the stator frame;

Figure 7 is a perspective view showing the type of motor constructed according to this invention;

Figure 8 is an electrical diagram of the transformer and stator winding connections of the motor illustrated in Figure 7;

Figures 9 and 10 are views similar to Figures 7 and 8 but showing another form of motor construction;

Figures 11 and 12 are similar views in connection with a three-phase motor;

Figure 17 is a diagrammatic view showing another manner of making the secondary connections in a three-phase transformer as shown in Figure 11.

General arrangement

Figure 13:
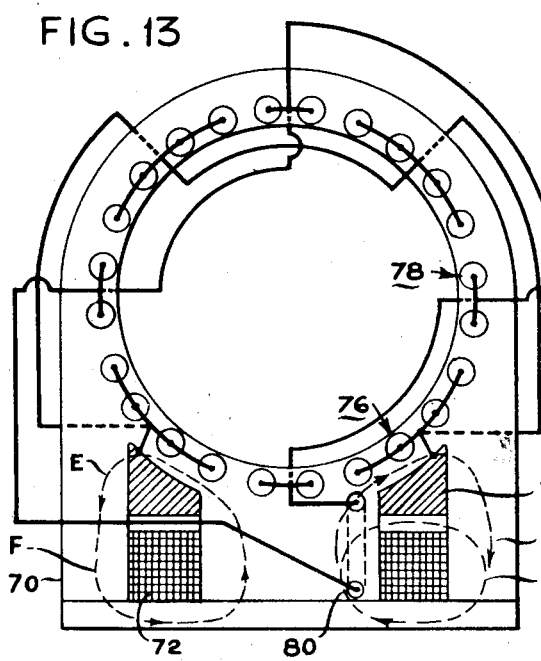
Figure 13 is the diagram of an electric motor having a starting winding therein.

An electric motor constructed according to this invention comprises an iron frame having field windings therein and a rotor of any type mounted within the said frame. Accordingly to this invention, the field windings in the stator comprise unitary heavy conductors, one for each stator slot, and are so arranged that the necessary magnetic poles for the operation of the motor are established.

The iron frame of the motor has integral therewith a transformer which has a primary coil that is connected with a commercial source of electric power. The secondary of the transformer comprises a single loop which is permanently connected in circuit with the stator windings of the motor. By this arrangement, a low voltage supply of current at sufficiently high amperage is obtained for energizing the stator windings of the motor.

According to this invention, this principle may be utilized in connection with single-phase or three-phase motors equally well and further may be applied to a motor having a starting winding which is temporarily energized during the starting period of the motor, and to split-phase type motor wherein there are two field windings displaced a predetermined amount.

While the transformer and motor frame are integrally formed, the transformer magnetic circuit may be entirely independent from that of the motor, or the motor and the transformer magnetic circuits may have certain portions thereof common.

The preferred method of manufacturing a motor and transformer combination according to the present invention is to cast the transformer secondary and the stator windings as a single integral unit by any suitable means, preferably by pressure die casting.

*Structural arrangement*

Referring to the drawings, Figure 1 illustrates a motor constructed according to this invention and which comprises a laminated magnetic motor frame 10 and a rotor 12 rotatably mounted therein, as by the anti-friction bearings 14 and 16 which are carried, respectively, in the end covers 18 and 20 which are secured to the frame 10 as by the through bolts 22. Reference to Figures 2 and 3 will reveal that the lower end of the frame 10 is shaped in the manner of a shell type transformer and has the spaced apertures 24 and 26 therein. Around the center leg formed by the said apertures is wound a coil 28. The upper ends of the apertures 26 have therein the single loop transformer secondary indicated by the numeral 30 which, as seen in Figure 2 has its opposite ends connected by the straps or bars 32 and 34 with the motor stator windings. The motor stator windings comprise solid conductors passing through slots in the stator as shown in Figure 4 wherein the stator slots are represented by the numeral 36 while the conductive material therein is indicated at 38. Preferably, the winding is distributed substantially completely around the periphery of the stator according to practices well known in connection with electric motors.

The preferred method of constructing the motor stator shown in Figures 1, 2 and 3 is to stack the required number of laminations together and thereafter to rivet the stacked laminations into a unit as by the rivets indicated at 40. This unit may then be milled out if desired on its opposite faces for receiving the transformer secondary and the end connections of the stator winding. It will be understood, however, that the milling out of the faces of the stator frame is optional, and that the transformer secondary and the stator windings may project therefrom if desired.

While the stator windings and single loop transformer secondary can be fabricated from suitable bar stock and placed within the stator frame and thereafter suitably connected together by jumpers and end rings, the preferred method is to form the said windings by pressure die casting as illustrated in Figures 5 and 6. In these figures it will be seen that the stator frame 10 is placed between a pair of members 42 and 44 and that the central bore of the frame is closed by a plug 46 and the apertures 24 and 26 are at least partially closed by the plugs 48 and 50. The stator frame, having previously been milled out to accommodate the end connections of the windings, may now have the entire stator windings and transformer secondary cast therein as an integral unit by forcing molten conductive material into the winding space through the sprue opening 52 as from the nozzle 54. If the stator frame had not previously been milled out to receive the end connections of the stator windings and the transformer secondary, then the plates 42 and 44 may be recessed to form these connections when the material is cast into the frame, and equivalent results will obtain.

It will be understood that the space in the apertures 24 and 26 formed by the plugs 48 and 50 is for the purpose of receiving the primary winding 28 of the transformer, and that under certain circumstances the winding may be placed in position prior to the casting of the transformer secondary and the stator winding. In any case, the stator frame will be formed in at least two parts to permit the insertion of the winding 28 after it has been preformed, rather than requiring that the said winding be wound within the frame, and through the apertures 24 and 26.

Figures 7 and 8 show, more or less diagrammatically, the arrangement of a four-pole single-phase motor constructed as shown in Figures 5 and 6. These figures bear similar numbers for similar parts and it will be understood that while there are only shown three conductors per pole, the stator winding would be more or less uniformally distributed completely around the periphery of the stator in actual practice.

In order to illustrate the relationships of the magnetic circuits of the transformer and stator windings, these are illustrated in Figure 7 by the dashed lines A and B. The dashed lines at A represent the magnetic path of the transformer while the lines at B represent the magnetic paths for the stator windings. It will be noted that the arrangement of the motor as exemplified in Figure 7 provides for the transformer and stator magnetic paths to be substantially independent while at the same time utilizing the magnetic material of the motor frame to the fullest extent.

In Figure 9, there is shown a modified arrangement for a four-pole single-phase motor wherein the center leg of the transformer forms a portion of the magnetic circuit for the stator. In Figure 9, the primary winding of the transformer is indicated at 50 and the center leg of the transformer core is indicated at 52. On each side of the center leg there is a slot 54 within which there is formed the single loop secondary 56. The secondary 56 is connected with the windings 58 of the stator, and it will be apparent that the number of windings required in the stator are only one-half of that required in the construction shown in Figure 7. The magnetic circuit for the transformer in Figure 9 is indicated by the dotted loops marked C, while the magnetic circuit for the stator is indicated by the loops marked D. It will be apparent that the upper ends of the loops marked C comprise a portion of the magnetic field in which the rotor of the motor will turn, and that the motor rotor forms a portion of the magnetic structure through which the transformer field passes.

In Figure 11, there is shown a construction substantially identical with that shown in Figure 7 except that the motor illustrated is a four-pole three-phase motor rather than a single phase motor. In order to accomplish this, the transformer portion of the motor frame has the three legs 60, 62, and 64, thereof formed to substantially the same cross-sectional area, and there is a winding 60', 62', and 64' on each thereof. Extending around each of the aforementioned legs is also a single loop secondary as indicated at 60'', 62'', and 64''. The secondaries are connected in circuit with three distributed four-pole stator windings which are indicated at 66, 68, and 70, and each of which is substantially identical with the single phase winding shown in Figure 7.

While any well known system of connecting three-phase circuits may be employed for connecting the transformer primaries, secondaries, and stator windings, the arrangement shown in Figure 12 is that of a star or Y connected system. It will be understood that a closed or open delta connection could also be employed if desired.

Figure 14:
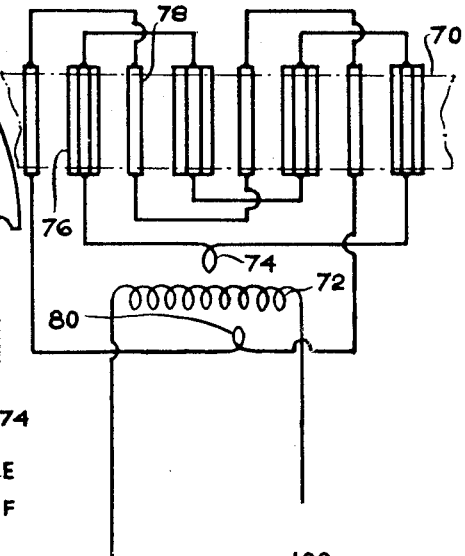
Figure 14 is a diagram of the transformer and stator connection of the motor of Figure 13.

The present invention is well adapted to the construction of self starting single phase motors wherein a starting winding is employed during the starting period of the motor, and thereafter becomes substantially deenergized. This is shown in Figures 13 and 14 wherein the stator frame is indicated at 70 and in which there is positioned the transformer primary 72 and the transformer secondary 74. The transformer secondary 74 is connected in the manner shown in Figure 7 with a running winding generally indicated by the numeral 76. Displaced from the winding 76 is a smaller winding which is generally indicated by the numeral 78. This smaller winding is displaced from the running winding by a sufficient amount to create the effect of a rotating magnetic field when both of the windings are energized in a predetermined sequence. For energizing the starting winding so that it will be effective only during the starting period, the frame 70 includes a single turn auxiliary secondary coil at 80. The opposite ends of the secondary 80 is connected with the starting winding in the same manner that the secondary 74 is connected with the running winding 76. These connections are illustrated in Figure 13 wherein the full lines represent connections on the near end of the stator and the dotted lines represent lines on the far end of the stator.

When the motor is running at or near full speed, there will be little opposition to the linking of secondary 74 by the flux from the transformer primary. This condition is represented by the dashed line E in Figure 13. However, when the motor speed is greatly reduced, or when the motor is being started, there is sufficient opposition to the complete linking primary flux, due to the reactance of the rotor that there will be a substantial amount of leakage flux which may be indicated by the dashed line F in Figure 13. It will be noted that the running flux E from the primary links with both sides of the secondary coil 80 so that there will be no appreciable voltage induced therein. However, when there is a substantial amount of leakage flux taking the path indicated at F, then there is a substantial linkage of the secondary 80 and a substantial voltage induced therein which causes a current to flow in the starting winding 78. The result is to produce a rotating field for the starting of the motor but substantially to eliminate all loss of energy to the starting winding after the motor has been brought up to speed.

Figure 15:
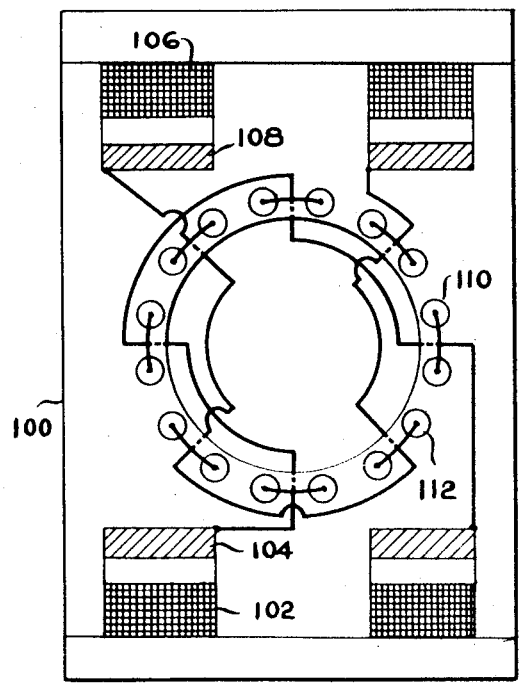
Figure 15 is a view similar to Figure 13 but showing a split-phase type motor.

In Figure 15, there is shown a split-phase type motor wherein there are two separate running windings each of which is supplied from an individual secondary from separate transformers. The phase angle of one of the windings is advanced by the inclusion of a capacitor in the primary winding of its associated transformer so that a revolving stator field is established whereby the motor is self-starting.

In Figure 15, the stator frame is indicated at 100 and it includes the transformer primary 102 and associated single loop secondary 104 at one end, and the transformer primary 106 and associated single loop secondary 108 at the other end. In the manner indicated in Figure 7, the secondary loop 104 is connected with a running winding indicated at 110, while the secondary 108 is connected with a running winding indicated at 112. The windings are preferably displaced 90 electrical degrees so that the motor will run equally well in either direction but will be understood that particular angular spacing of the two windings is subject to variation according to the particular motor being constructed and individual preference.

Figure 16:
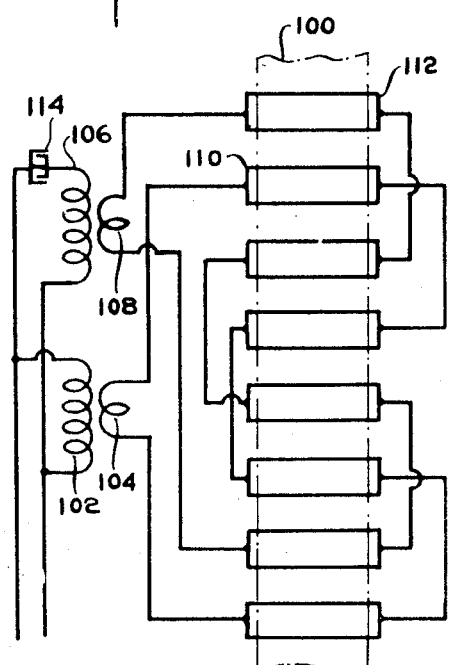
Figure 16 is an electrical diagram showing the transformer and stator connections of the motor in Figure 15.

As seen in Figure 16, the primary coil 106 has in series therewith the capacitor 114 by means of which the phase angle of the voltage induced in the secondary 108 is shifted so that the simultaneous energization of both of the motors will produce a rotating field. It will be understood that one of the windings of the stator could be disconnected after the motor had come up to speed if desired, but that the proper angular spacing of the said windings would eliminate the necessity for this.

In Figure 17, there is illustrated another manner of connecting a three-phase secondary winding for a transformer as illustrated in Figure 11. In Figure 17, the transformer comprises the three legs 116, 118, and 120, which have wound thereon the primary coils 116', 118', and 120'. The primary coils are connected in circuit with a three-phase power line for magnetizing the aforementioned legs. The transformer secondary in Figure 17 consists of a single heavy loop of wire, or a cast loop as indicated at 122. This loop passes around only the center leg but it will be obvious that the sides of the loop extending between the legs are under the influence of changes in magnetism in the transformer core structure brought about by the coils 116' and 120'. For making connections to the loop 122 for supplying voltages to the windings of motor associated with the transformer, connections are made to the opposite ends of the loop as at 124 and 126. A third connection is made at 128 which is the mid-point of the loop. Then, the three voltages of the secondary circuit are generated between 124 and 128, between 126 and 128, and between 124 and 126. Each of the pairs of terminals referred to above have substantially the same voltage generated therebetween because of an equal linkage of the secondary winding therebetween with the magnetic lines of force in the transformer core. It will be apparent that the secondary circuit illustrated in Figure 17 is of the open delta type but that the primary circuit of the transformer, and the circuit of the windings in the motor stator could be of any well known type of connections.

From the foregoing it will be seen that this invention provides for a new type of motor construction, and method of manufacturing the same wherein improved results obtain because of the more efficient use of the material in the motor.

It will further be seen that this invention, while not necessarily limited to the induction motors illustrated, is essentially of value in connection with alternating current motors. For example, alternating current generators either single or multi-phase could advantageously be constructed according to the teachings of this invention.

It will be understood that this invention is susceptible to modification in order to adapt it to different usages and conditions and, accordingly, it is desired to comprehend such modifications within this invention as may fall within the scope of the appended claims.

I claim:

1. In an electric motor; a stator comprising a magnetic frame and a main winding; a starting winding in said stator displaced from said main winding; a transformer having a primary and secondary and a core comprising a portion of the magnetic frame of said stator; auxiliary windings in said transformer adapted for being magnetically linked with said primary during the starting period of said motor; and means connecting said secondary with said main winding and said auxiliary winding with said starting windings.

2. In an induction motor having a magnetic stator frame and running and starting windings therein; a transformer having a primary and a secondary and a core consisting of a portion of said stator frame; auxiliary secondary windings for said transformer positioned to be linked magnetically with the primary thereof while said motor is starting and not to be linked therewith when said motor is running at rated speed; means connecting said secondary with said main winding and said auxiliary secondary with said starting winding.

3. In an induction motor; a magnetic stator frame; a distributed winding in said frame and having a pair of terminals; spaced legs integral with said frame and projecting from the side thereof; means magnetically connecting the ends of said legs to form a transformer core; a primary winding; and a single turn secondary winding on one of said legs, said secondary winding having its terminals connected with said pair of terminals of said distributed winding so as to be integral therewith.

4. In an induction motor; a magnetic stator frame; a distributed winding in said frame and having a pair of terminals, said winding defining a plurality of magnetic poles; three spaced legs projecting from one side of said stator frame and formed integral therewith; means magnetically joining the ends of said legs to form a transformer core; a primary winding on the middle one of said legs; and a single turn secondary on said middle leg adjacent said stator frame, said secondary being integral with said distributed winding and having its ends connected with said terminals.

5. In an induction motor; a laminated magnetic stator frame; a cylindrical bore extending through said frame for receiving a rotor; a pair of adjacent bores extending through said frame having the axes of said bores parallel with that of the axes of said cylindrical bore, said other bores being adapted for having a primary transformer coil wound therethrough, and a unitary winding distributed around the periphery of said cylindrical bore and having a part extending through said other bores to form a single turn linking with the field of said primary coil.

6. In an induction motor; a magnetic stator frame; a cylindrical bore extending through said frame for receiving a rotor; a pair of adjacent bores extending through said frame having their axes parallel with that of said cylindrical bore, said adjacent bores having a primary transformer coil wound therethrough, and a unitary winding distributed around the periphery of said cylindrical bore and including a single turn linking with the field of said primary coil, said single turn having its side parts extending through said other bores.

7. In an induction motor; a magnetic frame, a cylindrical bore extending through said frame for receiving a rotor, a pair of other bores extending through said frame having their axes parallel with that of said cylindrical bore, said other bores being adapted for having a primary transformer coil wound therethrough, a rigid unitary winding distributed around the periphery of said cylindrical bore and including a single turn secondary looping around that part of the frame extending between said other bores, and grooves in said frame for receiving said winding whereby the windings are everywhere substantially flush with said frame.

8. In an electric motor having a magnetic frame; field windings comprising single loops of conductive material in the motor stator portion of said frame; a primary transformer winding mounted so that a portion of said frame forms the core thereof, said portion projecting from the stator portion of said frame; and a single loop secondary for said transformer integral with said windings and mounted so that it loops that portion of the frame forming the core of the primary windings, the magnetic circuits for said frame and for said transformer being substantially independent.

THOMAS R. CLARK.

REFERENCES CITED

The following references are of record in the file of this patent:

UNITED STATES PATENTS

| Number | Name | Date |
|---|---|---|
| 609,990 | Lamme | Aug. 30, 1898 |
| 850,684 | McMillan | Apr. 16, 1907 |
| 1,920,318 | Fleger | Aug. 1, 1933 |
| 1,989,958 | Waters | Feb. 5, 1935 |
| 2,219,457 | Schweitzer | Oct. 29, 1940 |

FOREIGN PATENTS

| Number | Country | Date |
|---|---|---|
| 530,038 | France | Sept. 23, 1921 |